(No Model.)

F. L. SHEPPARD.
HOT AIR FURNACE.

No. 433,749. Patented Aug. 5, 1890.

Witnesses:
A. V. Groupé
R. Schleicher

Inventor:
Franklin L. Sheppard
by his Attorneys
Howson & Howson

UNITED STATES PATENT OFFICE.

FRANKLIN L. SHEPPARD, OF PHILADELPHIA, PENNSYLVANIA.

HOT-AIR FURNACE.

SPECIFICATION forming part of Letters Patent No. 433,749, dated August 5, 1890.

Application filed February 20, 1890. Serial No. 341,099. (No model.)

*To all whom it may concern:*

Be it known that I, FRANKLIN L. SHEPPARD, a citizen of the United States, and a resident of Philadelphia, Pennsylvania, have invented certain Improvements in Hot-Air Furnaces, of which the following is a specification.

The object of my invention is to provide in a heating-furnace a large amount of radiating-surface and to attain an even and regular combustion and uniform distribution of heat to the radiating portions of the furnace, and I so arrange the parts as to prevent the deposit of soot upon exposed surfaces. These objects I attain in the following manner, reference being had to the accompanying drawings, in which—

Figure 2:
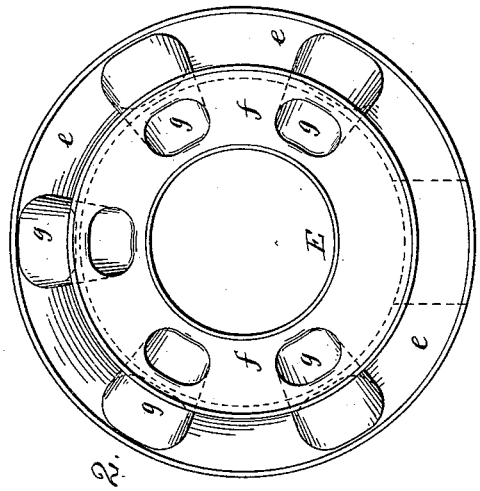
Figure 3:
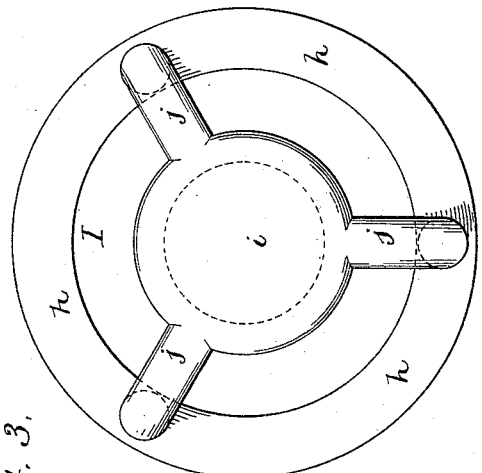
Figure 1:
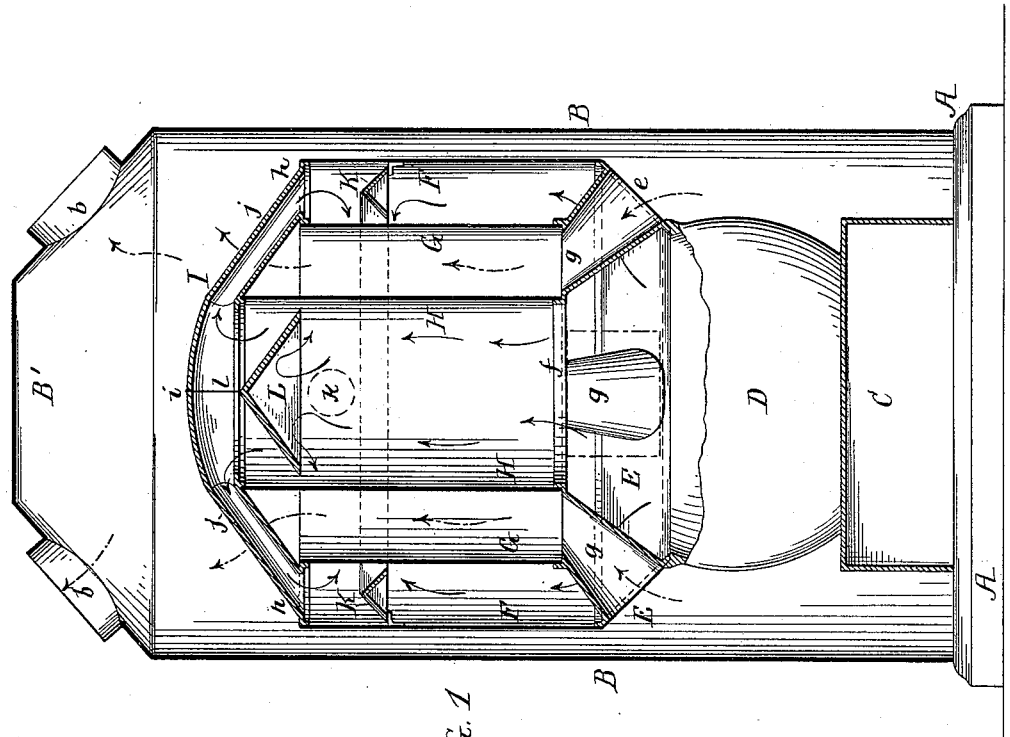

Figure 1 is a vertical section of my improved hot-air furnace. Fig. 2 is a detached plan view of the lower drum-casting. Fig. 3 is a detached plan view of the upper drum-casting.

A is the base of the furnace, which can be either mounted, as shown, or on suitable legs. In this base I preferably form inlet-openings for cold air. Mounted on the base is the cylindrical outer casing B, having a dome B', provided with one or more flue-openings $b\ b$ for the passage of hot air to the different apartments.

C is the ash-pit, and D the fire-pot, which can be of any form desirable. Mounted on the fire-pot is what I term the "lower drum-casting" E, composed of two annular rings $e$ and $f$. The ring $e$ is inclined upward and outward, as clearly shown in Fig. 1, and supports the outer drum F. The ring $f$ is connected to the ring $e$ by a series of tubes $g\ g$, forming hot-air channels. The ring $f$ supports the middle drum G and the inner drum H. The inner drum H forms a central smoke-chamber, and a hot-air chamber is formed between the drum H and the drum G, which connects with the annular air-chamber through the channels $g\ g$. An outer smoke-chamber is formed between the drums G and F, the products of combustion passing up from the fire-pot to this outer chamber through the space between the rings $e$ and $f$ of the lower drum-casting E. Thus it will be seen that the inner annular hot-air space derives its heat both from the inner smoke-chamber and the annular smoke-chamber.

Mounted on the drums F, G, and H is the upper drum-casting I. (Shown clearly in Figs. 1 and 3.) This casting has a central dome $i$ covering the central smoke-chamber. The annular ring $h$, forming part of the upper drum-casting, is connected to the dome by tubular arms $j$, forming smoke-passages which communicate with the central smoke-chamber.

The smoke-flue $k$ (shown by dotted lines in Fig. 1) communicates with the annular smoke-chamber contained between drums G and F. Suspended in the outer or annular smoke-chamber is a spreader-ring K, supported in the present instance on brackets secured to the outer drum F; but it will be understood that other means of supporting the ring may be used. The ring in some instances may be suspended by wires from the upper drum-casting. The ring is somewhat smaller than the flue, so as to allow for the passage of the products of combustion, and the spreader-ring is also made conical in cross-section, so as to prevent the lodgment of dust and soot, which will pass from the spreader-ring through the flue to the fire-pot. The ring $e$ of the lower drum-casting is of such an inclination as to prevent the lodgment of soot thereon.

Suspended by a wire $l$ from the dome I is a conical spreader-plate L, somewhat smaller in diameter than the smoke-chamber, so as to leave an annular smoke-passage. The upper surface of the spreader-plate L is of such an inclination as to prevent the lodgment of soot and dust. Thus it will be seen that the exterior surfaces of the two smoke-chambers furnish a very large radiating-surface, giving uniform distribution of heat, and the interposition of the spreader-plate and ring in the respective smoke-chambers regulates the outflow of the products of combustion, at the same time forcing them against the drums, tending thereby to heat the air as it passes up through the furnace.

The operation of the furnace is as follows: The products of combustion generated in the fire-pot and combustion-chamber formed by the lower drum-casting are divided in their passage to the smoke-flue, part being directed outwardly, passing between the rings $e$ and $f$ around the air-channels $g\ g$ into the annular smoke-chamber and upward and backward toward the smoke-flue. The balance of the products of combustion pass directly upward into the central smoke-chamber, through the tubular arms *j j* in the upper drum-casting to the annular smoke-chamber, thence into the smoke-flue *k*. The spreader-plate and ring retard the products of combustion, compelling them to pass in close contact with the radiating-surfaces of the drum.

I have shown in the drawings the upper and lower drum-castings made each of a single casting; but it will be understood that each can be made of one or more parts bolted or otherwise secured together, without departing from my invention.

I claim as my invention—

1. The combination, in a heating-furnace, of the outer casing, the fire-pot, the lower drum-casting mounted thereon, having inclined sides, inclined hot-air channels in said casting extending from the inclined sides to the upper surface of the casting, an upper drum-casting composed of a central disk, an outer ring, hollow arms forming smoke-passages connecting the ring to the disk, vertical drums between the lower and upper drum-castings forming a central smoke-chamber, an outer smoke-chamber, and an annular hot-air space, substantially as set forth.

2. The combination, in a heating-furnace, of the outer casing, the fire-pot, the lower drum-casting forming the combustion-chamber, hot-air channels therein, with an upper drum-casting having smoke-passages therein, drums between the lower and upper drum-castings forming a central smoke-chamber, an annular outer smoke-chamber and an inner annular hot-air space between the two smoke-chambers, a central spreader-plate in the central smoke-chamber, and an annular spreader-plate in the annular smoke-chamber, with a smoke-outlet for the annular chamber, substantially as set forth.

3. The combination, in a heating-furnace, of the inner, outer, and middle drums, the lower drum-supporting structure having air-channels therein, with an upper drum structure having a central hood adapted to the inner drum, an annular ring on a plane below the hood and adapted to fit on the middle and outer drums, and inclined radiating tubular arms connecting the hood and ring and forming inclined smoke-flues, substantially as specified.

4. The combination, in a furnace, of the drums forming an annular smoke-chamber, a lower drum-supporting structure, with an annular spreader-ring K centrally suspended in said smoke-chamber, the said ring being conical in cross-section and narrower than the width of the chamber, whereby the products of combustion can pass on either side of the ring, heating both drums uniformly, substantially as set forth.

5. The combination, in a furnace, of the drums forming an annular smoke-chamber, a central smoke-chamber, an intervening hot-air passage, a lower drum-supporting structure, air-passages therein, a central conical spreader-plate L in the central chamber, and an annular spreader-ring K in the annular smoke-chamber, substantially as described.

In testimony whereof I have signed my name to this specification in the presence of two subscribing witnesses.

FRANKLIN L. SHEPPARD.

Witnesses:
 HENRY HOWSON,
 H. F. REARDON.